United States Patent
Jacon et al.

(10) Patent No.: US 11,851,200 B2
(45) Date of Patent: Dec. 26, 2023

(54) FIRE RESISTANCE DEVICE DESIGNED TO BE PLACED BETWEEN ONE END OF A MOUNTING STRUT FOR AN AIRCRAFT TURBOMACHINE AND A COWLING OF SAID TURBOMACHINE DELIMITING AN INTER-FLOW COMPARTMENT

(71) Applicant: SAFRAN AIRCRAFT ENGINES, Paris (FR)

(72) Inventors: Bruno Alexandre Didier Jacon, Moissy-Cramayel (FR); Baghdad Achbari, Moissy-Cramayel (FR); Hervé Simonotti, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 536 days.

(21) Appl. No.: 17/253,441

(22) PCT Filed: Jun. 25, 2019

(86) PCT No.: PCT/FR2019/051554
§ 371 (c)(1),
(2) Date: Dec. 17, 2020

(87) PCT Pub. No.: WO2020/002822
PCT Pub. Date: Jan. 2, 2020

(65) Prior Publication Data
US 2021/0122482 A1    Apr. 29, 2021

(30) Foreign Application Priority Data

Jun. 29, 2018    (FR) ..................................... 1856041

(51) Int. Cl.
*F02C 7/25*    (2006.01)
*B64D 27/26*    (2006.01)
(Continued)

(52) U.S. Cl.
CPC ............... *B64D 27/26* (2013.01); *F02C 7/20* (2013.01); *B64D 27/18* (2013.01);
(Continued)

(58) Field of Classification Search
CPC ..... B64D 2045/009; B64D 27/18; F02C 7/25; F02C 7/28; F05D 2240/55; F05D 2240/90; F05D 2220/32
See application file for complete search history.

(56) References Cited

U.S. PATENT DOCUMENTS

| 2008/0053107 | A1* | 3/2008 | Weaver | ..................... F02C 7/28 415/138 |
| 2015/0098810 | A1* | 4/2015 | Soria | ....................... F01D 25/28 415/200 |

(Continued)

OTHER PUBLICATIONS

U.S. Appl. No. 16/970,035, filed Aug. 14, 2020, Bruno Jacon et al.
(Continued)

*Primary Examiner* — Tye William Abell
(74) *Attorney, Agent, or Firm* — Oblon, McClelland, Maier & Neustadt, L.L.P.

(57) ABSTRACT

A fire resistance device designed to be placed between a mounting strut of a double-flow aircraft turbomachine and a connecting cowling with which the turbomachine is equipped, the connecting cowling being designed to connect an upstream ring, delimiting an inter-flow compartment, to an arm that extends radially across a secondary flow of the turbomachine. The device can be produced as a single piece and includes two contact lips which extend along different lines, the first lip having a C-shaped cross-section.

10 Claims, 9 Drawing Sheets

(51) Int. Cl.
*F02C 7/20* (2006.01)
*B64D 27/18* (2006.01)
*B64D 45/00* (2006.01)
*F02C 7/28* (2006.01)

(52) U.S. Cl.
CPC .......... *B64D 2045/009* (2013.01); *F02C 7/25* (2013.01); *F02C 7/28* (2013.01); *F05D 2220/323* (2013.01); *F05D 2240/55* (2013.01); *F05D 2240/90* (2013.01)

(56) References Cited

U.S. PATENT DOCUMENTS

| | | | | |
|---|---|---|---|---|
| 2015/0175272 | A1* | 6/2015 | Brochard | F02C 7/25 |
| | | | | 244/54 |
| 2018/0156051 | A1* | 6/2018 | Strutt | F01D 11/003 |
| 2018/0156129 | A1* | 6/2018 | Takeuchi | B64D 29/00 |
| 2018/0163631 | A1* | 6/2018 | Takeuchi | B64D 29/00 |

OTHER PUBLICATIONS

U.S. Appl. No. 16/969,228, filed Aug. 12, 2020, Bruno Jacon et al.
International Search Report dated Oct. 23, 2019 in PCT/FR2019/051554 filed on Jun. 25, 2019, 2 pages.
Preliminary French Search Report dated Feb. 18, 2019 in French Application No. 18 56041 filed on Jun. 29, 2018, 1 page.

* cited by examiner

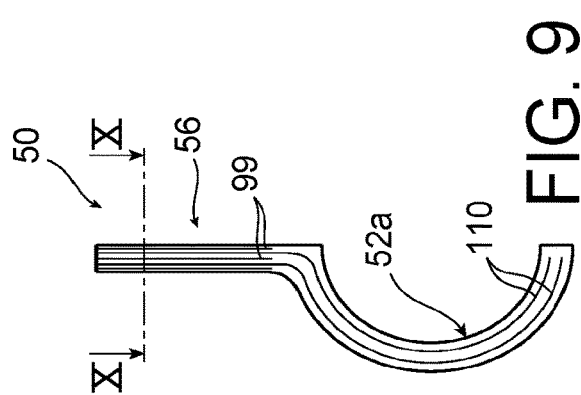
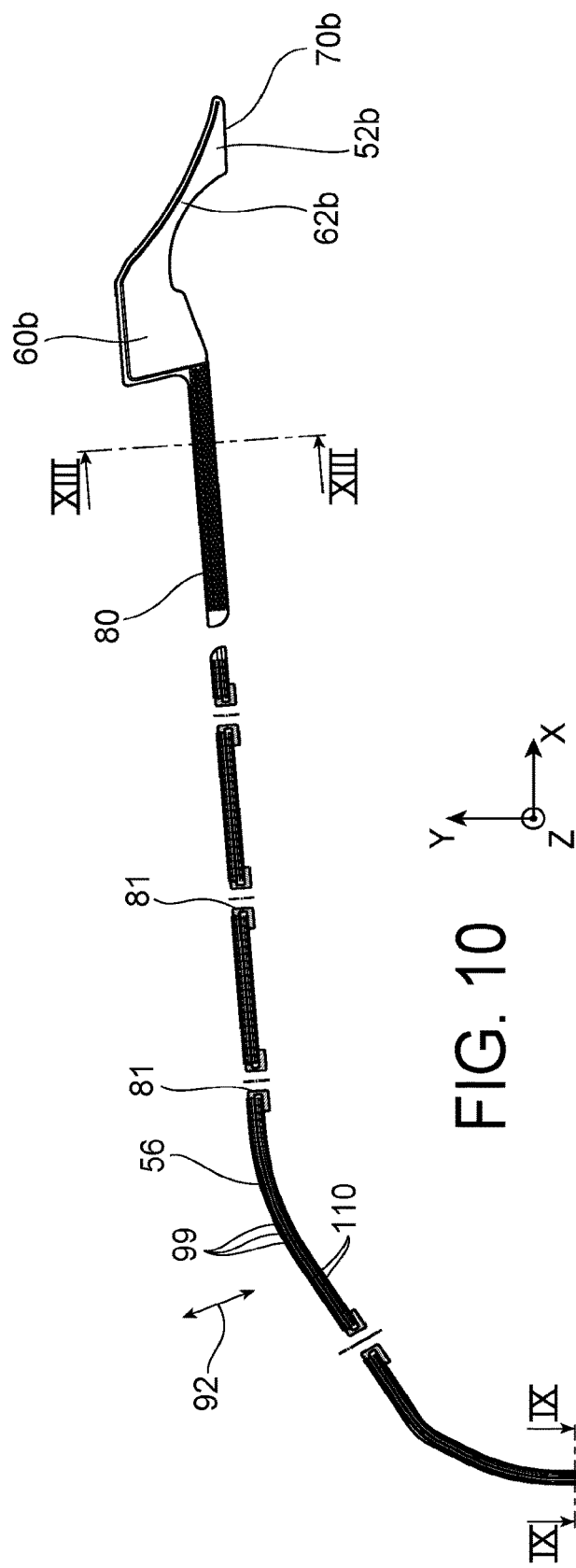

FIRE RESISTANCE DEVICE DESIGNED TO BE PLACED BETWEEN ONE END OF A MOUNTING STRUT FOR AN AIRCRAFT TURBOMACHINE AND A COWLING OF SAID TURBOMACHINE DELIMITING AN INTER-FLOW COMPARTMENT

TECHNICAL FIELD

The invention relates to the fire resistance function between an inter-flow compartment of a twin-spool turbomachine for an aircraft and a zone upstream from the mounting strut of this turbomachine. In particular, it aims to prevent a fire initiated in the inter-flow compartment from propagating in the zone upstream from the mounting strut.

The invention is applicable to all types of twin-spool turbine engines, and particularly to a turbojet.

STATE OF PRIOR ART

In a twin-spool turbomachine for an aircraft, there are usually one or several arms that pass radially through the fan flow stream, downstream from the fan. This arm is typically arranged so as to connect a fan compartment located around the outer shroud of an intermediate casing, to an inter-flow compartment. Conventionally, these two compartments house equipment and auxiliaries, while the arm placed between the two provides the passage for different elements such as electrical cables, and/or fluid pipes.

The radially internal end of such an arm is connected to an upstream ring, partly delimiting the inter-flow compartment radially outwards. This ring thus forms the upstream end of the set of cowlings forming the external envelope of the inter-flow compartment. It is planned to intercalate two connection cowlings between the arm and the upstream ring, laterally on each side of an upstream end of the mounting strut, to make the junction between the arm and the upstream ring.

The mounting strut that is used to fix the turbomachine onto an aircraft wing element, can have an upstream end close to the junction between the arm passing through the fan flow stream and the upstream ring of the inter-flow compartment. The problem of the fire resistance function then arises, because it is required to prevent the propagation of a flame initiating in the inter-flow compartment, particularly to prevent this flame from reaching the zone upstream from the mounting strut located nearby.

Consequently, there is a need to create a fire resistance device with a design that guarantees the required function, enables easy integration into the dense and complex environment of the zone concerned, and facilitates fabrication.

SUMMARY OF THE INVENTION

To satisfy this problem, the primary purpose of the invention is a fire resistance device designed to be placed between an upstream end of a mounting strut of an aircraft twin-spool turbomachine, and a connection cowling installed on this turbomachine, said connection cowling being designed to connect an upstream ring delimiting part of an inter-flow compartment radially outwards, to an arm, passing radially through a fan flow stream of the turbomachine. According to the invention, the device comprises:
- a contact structure comprising a first contact lip with a C-shaped section, preferably a semi-circular section, the contact structure also comprising a segment with a bead, preferably a circular bead, at one on the longitudinal ends of the first contact lip, one of its axial ends being axially continuous with the first lip and the other axial end being closed off, the first lip and the beaded segment together defining a first contact end extending along a first curved line;
- a support portion; and
- a second contact lip supported by the support portion through a junction zone that supports the beaded segment of the contact structure, the second contact lip having a second contact end extending along a second line distinct from the first line.

Furthermore the fire resistance device is a single-piece.

The invention is thus advantageous in that it discloses a particularly effective fire resistance device that integrates perfectly into its environment, and the single-piece nature of which is such that it is particularly easy and inexpensive to manufacture, particularly with regard to the required tooling.

The single-piece aspect is possible due to the simple geometry of the device according to the invention, particularly by the use of contact lips. Furthermore, these do not require the use of an insert during manufacturing of the device, unlike for example the use of tubular contact zones, called bead or moulding contact zones. Furthermore, a lip is usually easily deformable, such that there is no need to subject it to a specific prestressing operation after assembly. The deformation required to guarantee its fire barrier function can simply be the result of bearing of a surrounding element, for example such as bearing of a pod mobile cover seal designed to be compressed in the zone.

It is noted that these advantages are not affected by the presence of the beaded segment, given that the beaded segment remains open at one of its axial ends. In particular, this characteristic guarantees that it is easy to manufacture the single-piece part. This beaded segment, arranged at one of the longitudinal ends of the first contact lip, enables easier local control of the seal as a result of its cross-section wider than the cross-section of the first C-shaped lip that it prolongs.

Furthermore, the C-shape of the first contact lip is found to be advantageous in that it is compatible with existing fire resistance devices incorporating beads fitted with connection pins at their longitudinal ends. The longitudinal end of the first contact lip of a fire resistance device according to the invention can thus cooperate perfectly with the connection pin of a complementary fire resistance device already installed on the propulsion assembly. This complementarity of shapes facilitates the junction between two devices that can be compared with nesting of the pin in the open section of the first contact lip.

In other words, the C shape of the first lip facilitates the connection of the device according to the invention with a conventional device already used on the propulsion assembly. Consequently, when this propulsion assembly comprises two fire resistance devices connected to be continuous with each other, it becomes possible to replace only one of the two devices. Maintenance of these fire resistance devices is thus facilitated and secured.

Finally, note that with the contact structure and the second contact lip, the fire resistance device according to the invention can form two distinct and substantially contiguous physical barriers. One is designed to stop a fire in the inter-flow compartment so that it does not propagate circumferentially towards the lateral face of the mounting strut nor radially towards an end face of this mounting strut, and the other is designed such that this fire will not propagate axially in the downstream direction, along this same lateral face of the mounting strut.

The invention preferably includes at least one of the following optional technical characteristics, taken in isolation or in combination.

Preferably, said second line is straight, and preferably substantially orthogonal to a first substantially plane contact surface in which the first curved line is inscribed. Nevertheless, other forms of line and other inclinations can be used depending on the bearing surfaces to be brought into contact, without going outside the framework of the invention.

Preferably, the device also comprises an attachment portion supporting the first contact lip, said attachment portion preferably containing through holes for the passage of attachment elements.

Preferably, the support portion carries elongated attachment elements, opposite the second lip and its protection zone. These elongated attachment elements can then easily cooperate with the connection cowling, for better retention on this cowling.

Preferably, the device is formed by the superposition of at least one layer of elastomer material, preferably a silicone elastomer, and at least one fibrous layer, preferably made of ceramic, glass or meta-aramid (poly(m-phenylene isophthalamide)). Nevertheless, other types of layers are possible without going outside the framework of the invention. It will be noted that a ceramic fabric layer is particularly efficient for the fire resistance function, while a glass fibre layer can stiffen the stack and limit creep of the silicone elastomer in the plane orthogonal to the superposition direction of the layers, if a mechanical stress is applied along this direction. Finally, such stiffening can also be achieved using a layer of meta-aramid fibres.

Preferably, one or several fibrous layers extend over the entire length of the first contact lip and the beaded segment, and one or several fibrous layers extend along the entire length of the second contact lip.

Another purpose of the invention is a propulsion unit for an aircraft comprising a twin-spool turbomachine for an aircraft, and a turbomachine mounting strut for use in fastening it to a wing element of the aircraft, the turbomachine comprising an inter-flow compartment formed between a core engine flow and a fan flow of the turbomachine, and an arm passing radially through a fan flow, and communicating with the inter-flow compartment that is partly delimited radially outwards by an upstream ring connected to the arm by means of two connection cowlings arranged with one on each side of the upstream end of the mounting strut, along a transverse direction of the propulsion assembly, the upstream end of the mounting strut comprising two lateral faces, and a peripheral bearing surface along the contour of a base of this upstream end of the mounting strut.

According to the invention, the propulsion assembly also comprises a fire resistance device as described above associated with at least one of the two connection cowlings, placed between the upstream end of the mounting strut and the connection cowling to which the device is fixed.

Preferably, the first contact end bears on the peripheral bearing surface of the upstream end of the mounting strut, and the second contact end of the second contact lip bears on the corresponding lateral face of the upstream end of the mounting strut.

Preferably, the first curved line is inscribed in a first approximately plane contact surface substantially parallel to the transverse direction, and to a longitudinal direction of the assembly, and the second line defined by the second contact lip is a straight line extending approximately parallel to a vertical direction of the assembly.

Preferably, the second contact lip is constrained between the lateral face of the upstream end of the mounting strut, and a pod mobile cover seal.

Finally, the propulsion assembly also comprises a complementary fire resistance device associated with the other of the two connection cowlings, placed between the upstream end of the mounting strut and the connection cowling to which the complementary device is fixed, the complementary device also comprising a contact structure in the form of a beaded seal, one longitudinal end of which is fitted with a connection pin cooperating with the other longitudinal end of the first contact lip belonging to the fire resistance device. As mentioned above, this specific feature illustrates the fact that the invention is in a form that enables assembly of the device on another existing device, with a different design and already fitted on the propulsion assembly.

Other advantages and characteristics of the invention will become clear after reading the following detailed non-limitative description.

BRIEF DESCRIPTION OF THE DRAWINGS

This description will be made with reference to the appended drawings among which;

FIG. 9 is a sectional view taken along line IX-IX on FIG. 10;

FIG. 10 is a sectional view along line X-X on FIG. 9;

DETAILED PRESENTATION OF PREFERRED EMBODIMENTS

Figure 1:
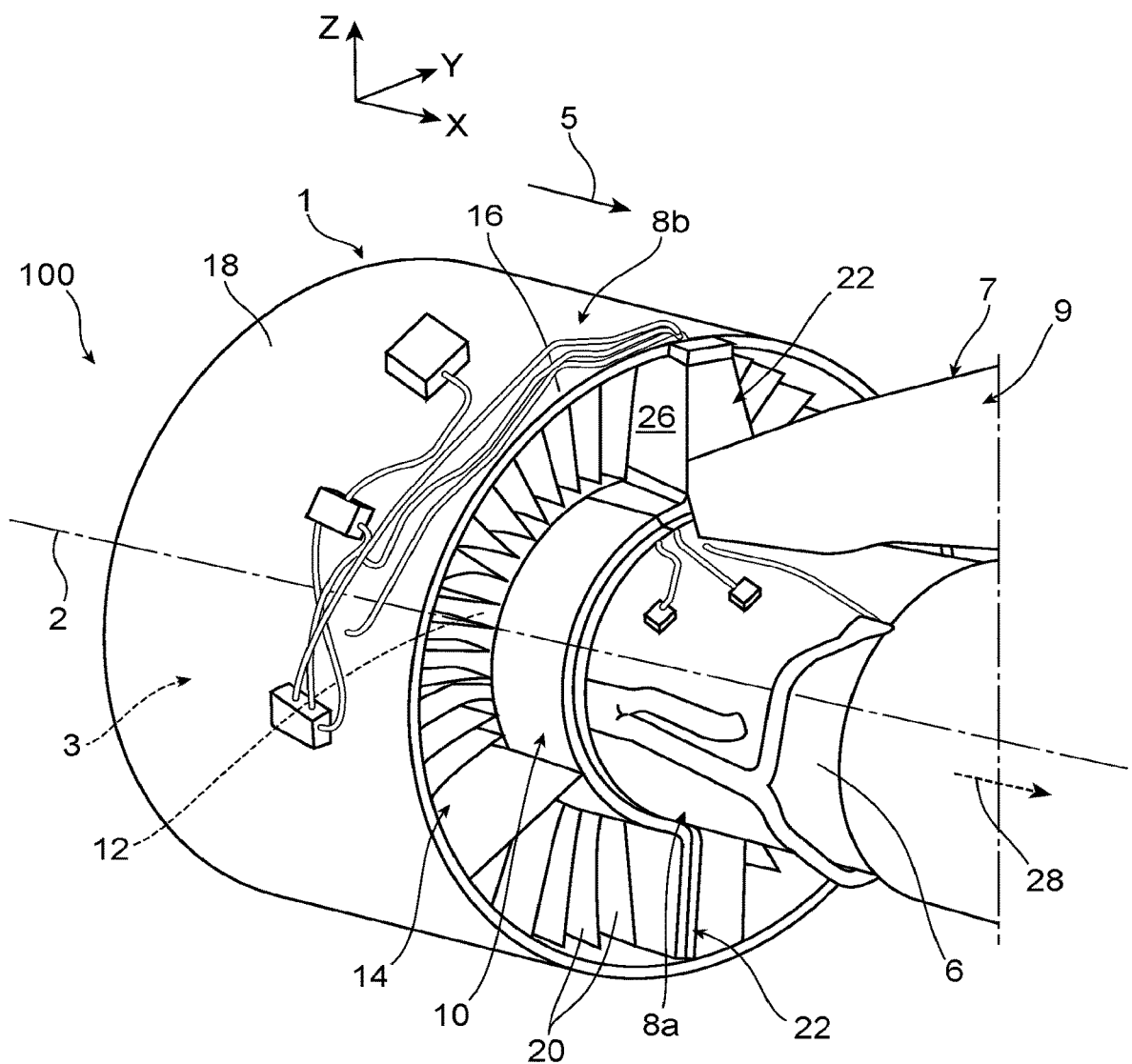
FIG. 1 is a partial diagrammatic perspective view of a propulsion assembly according to a preferred embodiment of the invention.

Firstly with reference to FIG. 1, the figure shows a partial view of a propulsion assembly 100 according to a preferred embodiment of the invention. This assembly 100 comprises a twin-spool turbomachine 1 for an aircraft, and a mounting strut 9 for this turbomachine on a wing element of the aircraft (not represented).

The propulsion assembly 100 has a longitudinal direction X, also corresponding to the longitudinal direction of the turbomachine 1 and to the longitudinal direction of the mounting strut 9. The assembly 100 also has a transverse direction Y, and a vertical direction Z, corresponding to the direction of the height. The three directions X, Y and Z are orthogonal to each other and form a right-handed trihedron.

Preferably, the mounting strut 9 is used to suspend the turbomachine 1 under a wing of the aircraft. This mounting strut comprises a structural part that will resist forces from the turbomachine, this part normally being called the primary structure or rigid structure. It is generally in the form of a caisson, of which only an upstream end 7 is represented on FIG. 1. The mounting strut is also equipped with secondary structures (not represented) in the form of aerodynamic fairing.

In the preferred embodiment described and represented, the turbomachine 1 is a twin-spool dual flow turbojet. The turbojet 1 has a longitudinal central axis 2 parallel to the X direction, around which its different components extend. It comprises, from upstream to downstream along a principal direction 5 of the gas flow through this turbomachine, a fan 3 then a gas generator conventionally composed of compressors, a combustion chamber and turbines. These elements of the gas generator are surrounded by a central casing 6, also called the "core" casing that radially delimits the interior of an inter-flow compartment 8a. This compartment 8a is delimited radially outwards by one or several cowlings, including an upstream ring 10 that is the only one shown on FIG. 1. The upstream ring 10 is formed in the downstream continuity of a hub 12 of an intermediate casing 14 of the turbojet. The intermediate casing 14 also comprises an outer shroud 16 located in the downstream continuity of a fan casing 18. It also comprises outlet guide vanes 20, formed downstream from the fan blades and connecting the hub 12 to the outer shroud 16.

The fan casing 18 and the outer shroud 16 together delimit a fan compartment 8b, in the radially inwards direction. This compartment 8b is also delimited in the radially outwards direction by one or several cowlings (not represented), forming part of a pod of the turbojet. Like the inter-flow compartment 8a, this compartment 8b houses equipment and auxiliaries, as is widely known in prior art.

One or several arms 22 is/are provided to connect the two compartments 8a 8b. For example, it can be two arms 22 installed on the turbojet, arranged in the 12 o'clock and 6 o'clock positions respectively. These arms 22 are hollow, and are used for example to circulate electrical cables and/or fluid pipes. More precisely, these arms connect a downstream part of the outer shroud 16, to the upstream ring 10. To achieve this, they pass through a fan flow stream 26 of the turbojet, this flow stream being partly delimited in the outwards direction by the shroud 16 and by the cowlings (not represented) located downstream from the shroud, and partly delimited in the inwards direction by the upstream ring 10 of the inter-flow compartment 8a. The fan flow stream 26 is additional to a core engine flow stream 28, that passes conventionally through the gas generator.

With reference to FIGS. 2 to 5, the figures represent a part of the propulsion assembly 100 including the upstream end 7 of the mounting strut 9, the arm 22 located in the 12 o'clock position, and the upstream ring 10. More precisely, on each side of the upstream end 7 of the mounting strut 9, along the Y direction, there are two connection cowlings 30 making the aerodynamic junction between the arm 22 and the upstream ring 10. The latter is thus not completely closed over 360°, but has an angular opening centred on the 12 o'clock position, at which the two connection cowlings 30 make the junction with the radially internal end of the arm 22.

On the figures, the assembly between the different elements is only represented for one side of the mounting strut, but it is understood that there is an identical or similar and preferably symmetric assembly on the other side of the upstream end 7 of the mounting strut 9. Thus, on each side of the mounting strut 9, the connection cowling 30 has an upstream end 32 that will be located in the downstream continuity of the hub of the intermediate casing. Its top end 33 is connected to a wall of the arm 22, whereas its circumferential end 35 is connected to a circumferential end of the upstream ring 10. Finally, its downstream end 38 forms an angular sector groove type housing 38, housing a pod seal 40 that is preferably supported by a mobile pod cover (not shown on FIGS. 2 to 5). This seal 40, also called a three-arm or tripod seal, comprises a node from which a first seal portion 40a extends being compressed in the housing 39 then on the upstream ring 10, a second seal portion 40b being compressed in the housing 39 then on the arm 22, and a third seal portion 40c being compressed on a lateral face 42 of the mounting strut. Each arm of the seal 40 is of the tubular, bead or moulding type.

Figure 3:
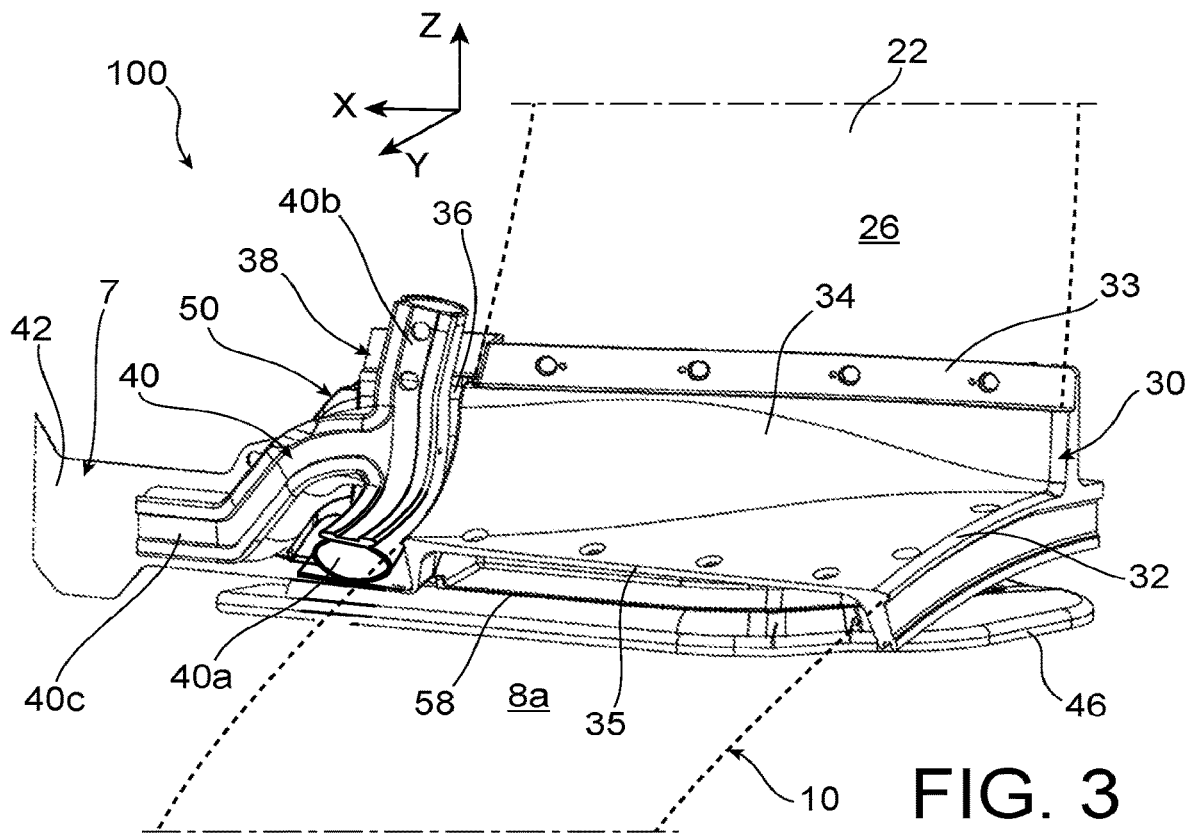
FIG. 3 represents a perspective view of the part shown on the preceding figure.
Figure 4:
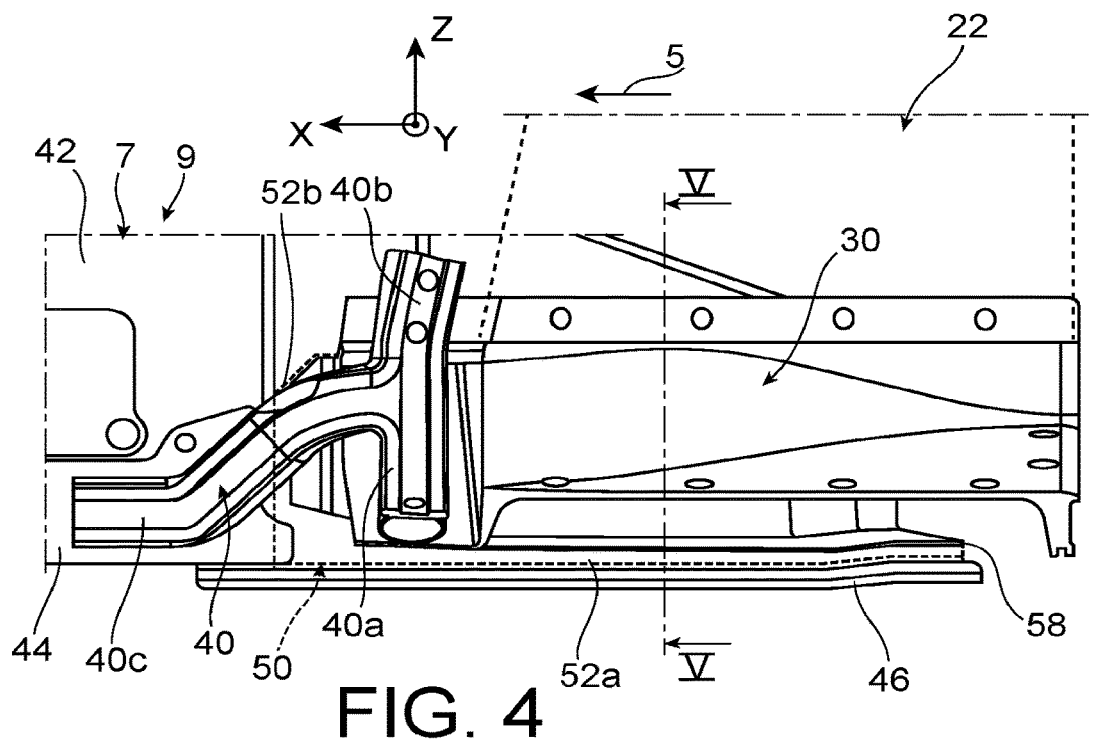
FIG. 4 is an elevation view of the view shown on the preceding figure, with the fire resistance device represented in dashed lines.

The seal 40 thus adopts its position shown in FIG. 3 after the mobile pod cover on which it is installed is closed, this cover then having an external surface that is continuous in the downstream direction with an external surface 34 of the connection cowling 30.

The upstream end 7 of the mounting strut 9 has a base 44, starting from which in particular the two lateral faces 42 extend. The base 44 is fixed to a peripheral contact surface 46 with a generally U shape, along the contour of this base 44. It is substantially plane, parallel to the X and Y directions. Its function lies essentially in setting up a fire resistance barrier between the inter-flow compartment 8a, and the upstream end 7 of the mounting strut. To satisfy this function, the assembly 100 comprises a fire resistance device 50 specific to the invention, associated with each connection cowling 30. In an alternative embodiment of the invention that will be described later, the assembly 100 comprises a fire resistance device specific to the invention associated with one of the two connection cowlings 30, and a more conventional complementary fire resistance device associated with the other connection cowling 30.

The two connection cowlings 30 may have identical or similar designs, for example being designed symmetrically relative to a longitudinal XZ plane passing through the axis 2. This configuration is represented diagrammatically on FIG. 2, also showing the association of the two devices 50 specific to the invention that join together at their upstream end to jointly define a profile similar to the profile of the peripheral bearing surface 46 against which they are compressed.

With reference to FIGS. 2 to 5, we will only describe one of the two devices 50 that have identical or similar designs, for example being designed to be symmetric about the longitudinal XZ plane passing the axis 2.

The fire resistance device 50 is thus placed between the upstream end 7 of the mounting strut, and its associated connection cowling 30 onto which this same device is fixed. In general, the device 50 has a first contact lip 52a and a second contact lip 52b, the first lip 52a bearing in contact with a radially external surface of the peripheral bearing surface 46, on a half-portion of this bearing surface. This first contact lip 52a is such that a fire that is declared in the inter-flow compartment 8a does not propagate circumferentially to the lateral face 42 of the mounting strut, nor radially outwards towards an upstream end face of this mounting strut.

The second contact lip 52b bears on the lateral face 42 of the mounting strut, downstream from the two portions 40a, 40b of the pod seal 40. It is designed to stop a fire in the inter-flow compartment 8a so that it does not propagate downstream in the axial direction, along the lateral face 42 of the mounting strut.

Figure 5:
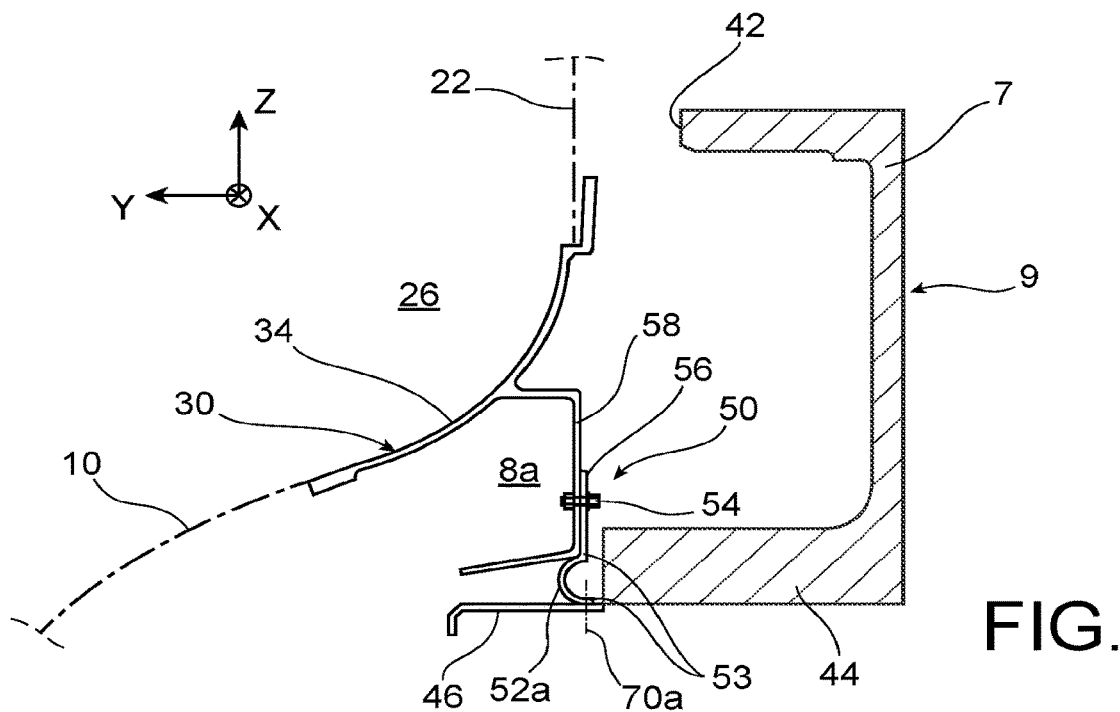
FIG. 5 is a sectional view taken along line V-V in FIG. 4.

With its lips, the device 50 provides an ingenious and effective solution to confer the fire resistance function, despite the relative movements that can be observed between the turbojet and the mounting strut, during the different flight phases of the aircraft FIG. 5 shows the first lip 52a with a low compression level, resulting from the relative position of the turbomachine and the mounting strut. This first lip 52a has a C-shaped cross-section, preferably semi-circular, corresponding to its nominal shape in the unstressed state. Thus, when the first lip 52a is compressed, its shape tends to flatten/become oval, such that its two circumferential ends 53 move towards each other, along a compression direction corresponding to the Z direction.

One of the two circumferential ends 53 bears in contact with the peripheral bearing surface 46, being approximately tangent to this bearing surface. The other end 53 is supported by an attachment portion 56, through which pass bolt or rivet type attachment elements 54. These elements 54 pass through the attachment portion 56 of the device 50, and a first support 58 of the connection cowling 30, located radially inwards between the connection cowling and the peripheral bearing surface 46. The general shape of the first support 58 is an U open laterally to the exterior, while the first semi-circular lip 52a is open laterally to the interior.

Thus, the attachment portion 56 extends downwards along the Z direction parallel to the base of the U 58, to connect one of the circumferential ends 53 of the first semi-circular lip 52a. The flexible connection zone between the attachment portion 56 and the end 53 is located close to the connection zone between the base of the U and its lower branch. Consequently, the upper part of the first lip 52a is preferably bearing on the lower arm of the first U-shaped support 58.

Furthermore, as seen in a cross-section like that in FIG. 5, the two circumferential ends 53 of the first lip 52a are preferably inscribed on a fictitious vertical line along which extends the attachment portion 56. In particular, this geometry is observed in the unstressed state of the first lip 52a. Nevertheless, it should be noted that the design of the fire resistance device 50 is such that contact between the first lip 52a and the peripheral bearing surface 46 can be maintained regardless of relative movements observed between the turbojet and the mounting strut, along each of the three directions X, Y and Z.

The circumferential end 53 cooperating with the bearing surface 46 defines the major part of a first contact end 70a of the device 50 with the mounting strut. This first contact end 70a is completed by a weak part projecting from a beaded segment 71, in other words a tubular segment, referenced on FIGS. 6a to 6d and preferably having a circular cross-section, the hollow part of which preferably remains empty. This segment 71 forms a contact structure 73 with the first lip 52a, intended to bear on the peripheral bearing surface 46 of the mounting strut.

The segment 71 is arranged to be continuous with the downstream longitudinal end 75a of the first lip 52a. More precisely, the circular beaded segment 71 has an open upstream axial end 77a, that is continuous with the downstream longitudinal end 75 of the lip 52a. Consequently, at the transition between the lip 52a and the segment 71 made by the ends 75a, 77a, the contact structure 73 changes from a circular section to a semi-circular section, possibly progressively, but preferably suddenly. More generally, regardless of the shape of the lip 52a and of the segment 71, the contact structure 73 changes from a closed section (within the segment 71), to half of this closed section (within the C-shape lip 52a).

The outside and inside diameters of the two ends 75a, 77a are substantially identical. These diameters are substantially constant along the entire contact structure 73, even if minor variations can be observed, for example within a range of plus or minus 15%.

The downstream axial end 77b of the segment 71 is closed off, for example with a dome shape. Due to this closing off and the tubular shape of the segment 71, this downstream part of the contact structure 73 provides a reinforced seal that is easier to obtain due to a larger transverse extent than that of the first C-shaped lip 52a prolonged by this segment.

As mentioned above, the circular beaded segment 71 only forms a small part of the contact structure 73, namely only its downstream end. Preferably, its length represents not more than 20% of the total length of the contact structure 73, and even more preferably it represents a percentage of less than 15%.

It is noted that for the lip 52a, the preferably circular nature of the segment 71 corresponds to its nominal shape as observed in the unstressed state. Thus, once arranged on the propulsion assembly, this segment 71 is also subjected to flattening/ovalling caused by relative movements between the turbojet and the mounting strut, in each of the three directions X, Y and Z. Nevertheless, other deformation types may be observed on this segment loaded essentially in compression, without going outside the framework of the invention.

Together, the first contact lip 52a and the lower end of the segment 71 can create a first sealing line on the peripheral bearing surface 46. As represented on FIG. 7, it is a first curved line 72a, following the profile of the half-bearing surface portion 46 associated with the contact structure. The first contact end 70a of this contact structure 70 (not represented on FIG. 7 but visible on FIGS. 6a and 6b), extends along this first generally L-shaped curved line 72a.

One of the specific features of the invention lies in the fact that the device 50 incorporates the above-mentioned second lip, the function of which is to create a second sealing line 72b on the lateral face 42 of the mounting strut 9. This second line is preferably straight, substantially parallel to the Z direction. Preferably, the two lines 72a, 72b shown on FIG. 7 join together at a radially internal downstream end of the device 50. Although the contact structure and the second lip can be directly contiguous at the beaded segment, they can alternately be connected by a material connector 79 that can be seen on FIG. 6b, connecting the closed-off downstream axial end 77b of the segment 71, to the radially inner end of the second contact lip 52b.

The device 50 will now be described in more detail, once again with reference to FIGS. 6a to 6d. These figures represent primarily the first curved line 72 along which there are the first lip 52a followed by the circular beaded segment 71. Line 72a is inscribed in a first substantially plane contact surface S1, that corresponds to the radially external surface of the peripheral bearing surface 46. This surface S1 can be strictly plane, or it can have one or several very low height levels, for example not exceeding a few millimetres. The surface S1 thus preferably corresponds to an XY plane of the propulsion assembly 100. Furthermore, the first curved line 72a that is inscribed in this XY plane has a general L-shape in which the corner between the base of the L and the leg of the L can be rounded, and in which the free end of the leg can also be rounded.

The attachment portion 56 extends upwards along the Z direction from the lip 52a, in the form of a blade in which passage holes 76 are formed through which the above-mentioned bolts 54 will pass. The passage holes 76 can be reinforced by inserts 81 added onto the device 50 later.

At the downstream longitudinal end 75a of the first lip 52a, the device 50 comprises a support portion 60 that also extends upwards substantially along the Z direction, starting from the upper circumferential end 53 of this lip More precisely, this support portion 60 is thicker, and is located adjacent to a rib 80 designed to increase the mechanical strength of the device 50. The rib 80 is placed between the attachment portion 56 and the block-shaped support portion 60. It also extends upwards substantially along the Z direction, parallel to the attachment portion 56 from which it can be separated, along the direction of the first curved line 72a. The thickness of the rib 80 is intermediate between the thickness of the attachment portion 56, and the thickness of the support portion 60. The same applies for its height along the Z direction.

The function of the support portion 60 is to carry the second lip 52b through a junction zone 62 placed between them. The thickness of the junction zone 62 is reduced, and it acts as a hinge for the second lip 52b that preferably remains straight and is not deformed or is only slightly deformed in bending, regardless of the degree of compression applied.

The junction zone 62 extends in the downstream direction from the support portion 60 substantially along the X direction. At its radially inner end, the junction zone 62 supports the upper part of the beaded segment 71 that is located upstream from the lip 52b supported by the downstream end of this junction zone 62.

The second contact end 70b of the second lip 52b extends along the second preferably straight line 72b, and preferably substantially orthogonal to the first contact surface S1. Thus, the second straight line 72b extends substantially along the Z direction, so that the lip 52b is in contact with the associated lateral face of the mounting strut.

Figure 6A:
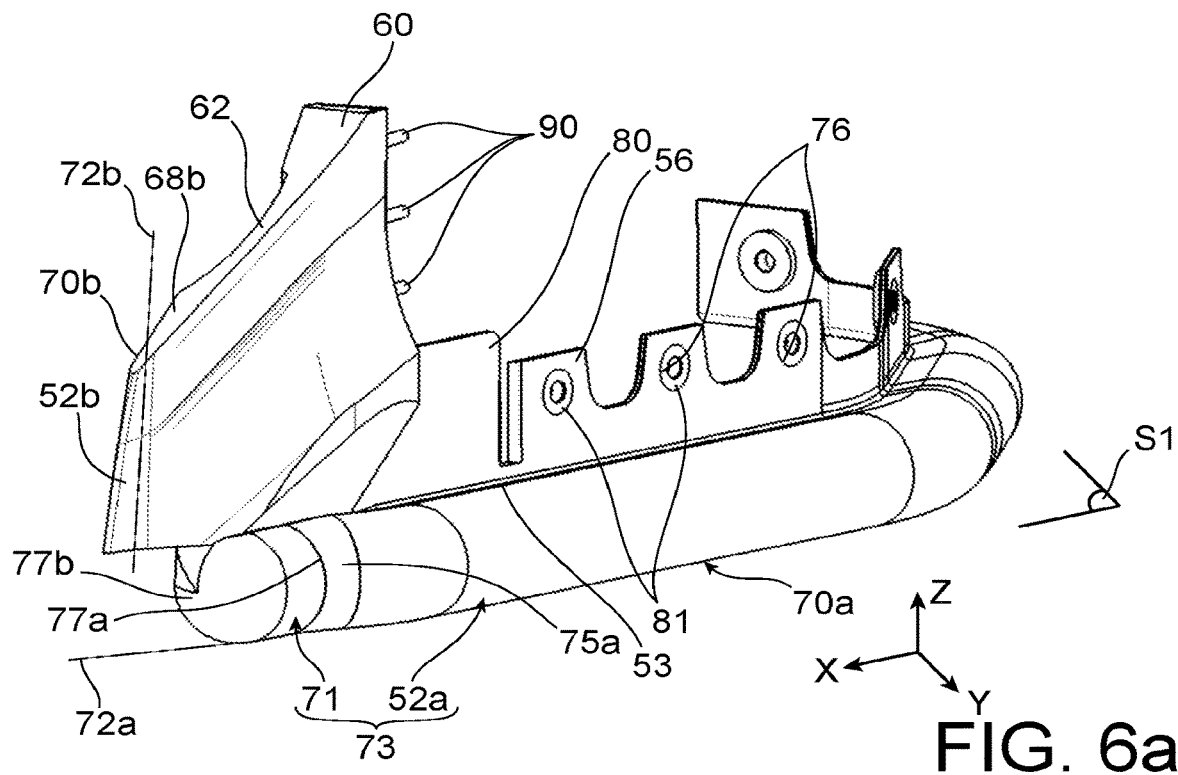
FIGS. 6a and 6b are perspective views of the fire resistance device shown on the preceding figures, at different viewing angles.
Figure 6B:
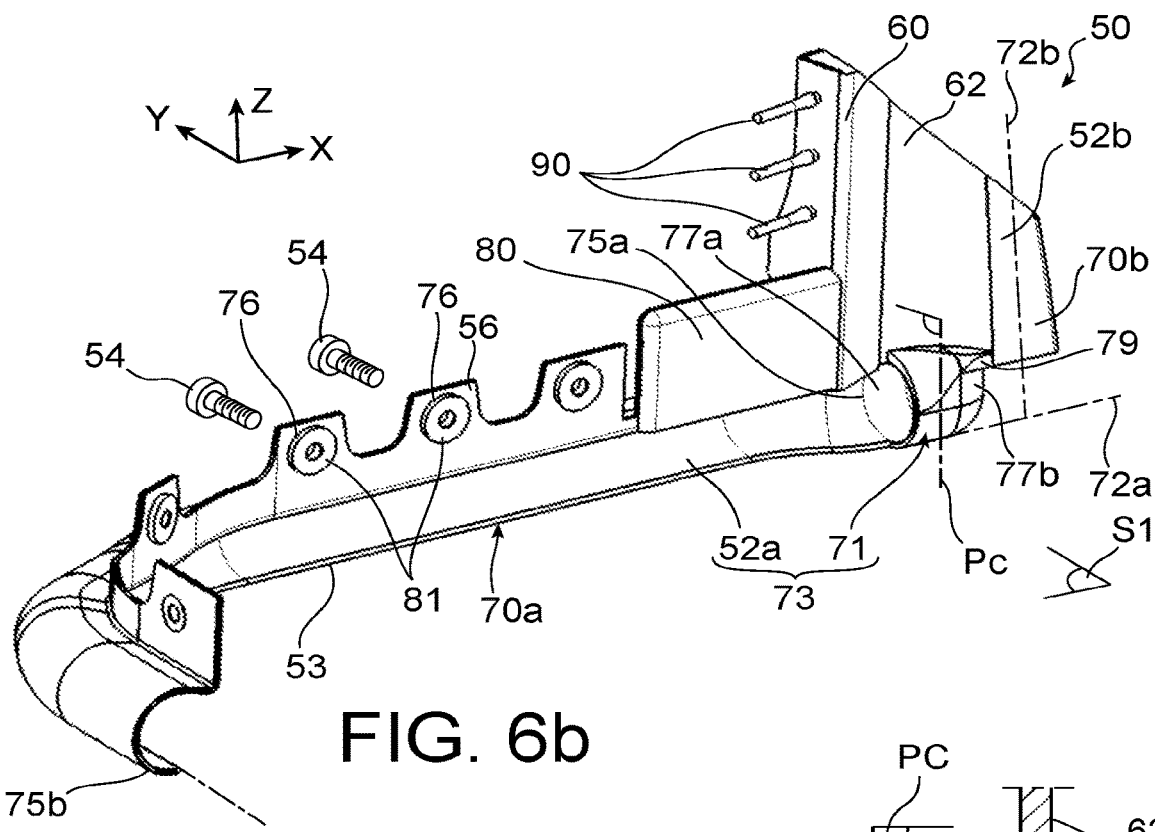
Figure 6C:
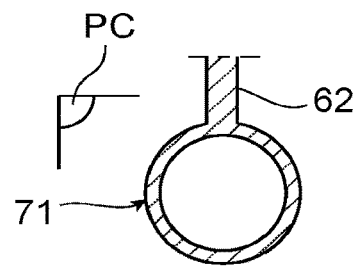
FIG. 6c is a sectional view in plane Pc in FIG. 6b, passing through the beaded segment.
Figure 6D:
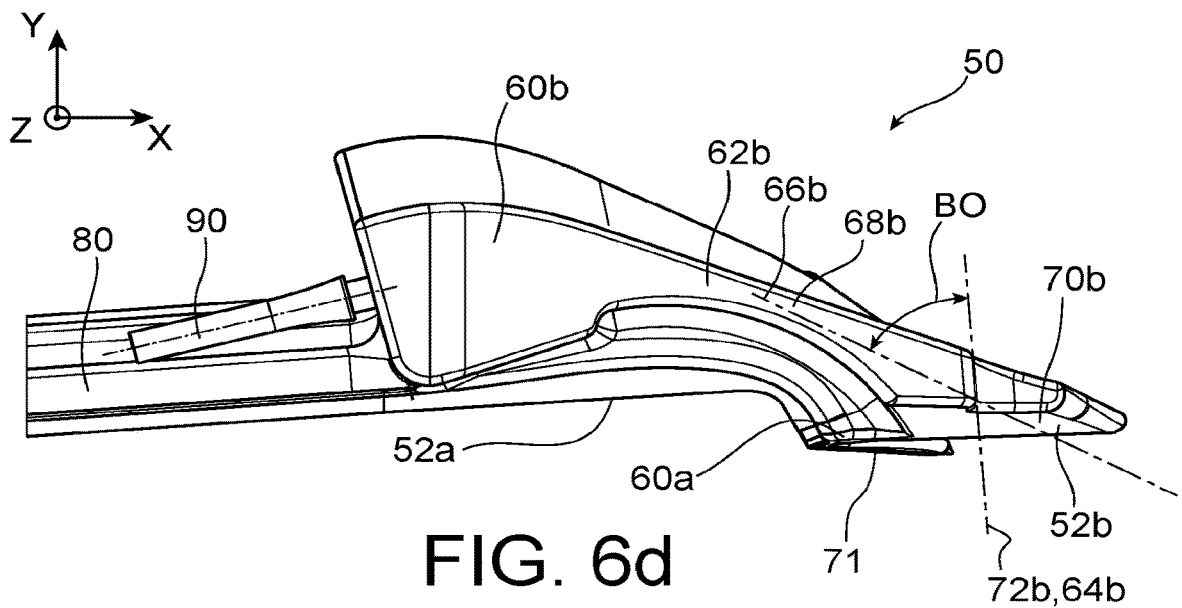
FIG. 6d is a top view of a part of the fire resistance device shown on FIGS. 6a and 6b.

The external radial end of the assembly formed by the elements 60, 62 and 52b is bevelled, as can best be seen on FIG. 6b.

Furthermore, the thickness of the second contact lip 52b increases with increasing distance from its base 68b referenced on FIG. 6a, towards the second contact end 70b. Consequently, the second contact end may be two-dimensional, for example in the form of a vertical strip. In the unstressed state represented on this FIG. 6d, an angle of inclination B0 can be observed between a normal 64b to the lateral face of the mounting strut (not represented), and a second general lip direction 66b defined between the base 68b, and the second contact end 70b of the lip 52b.

Figure 8:
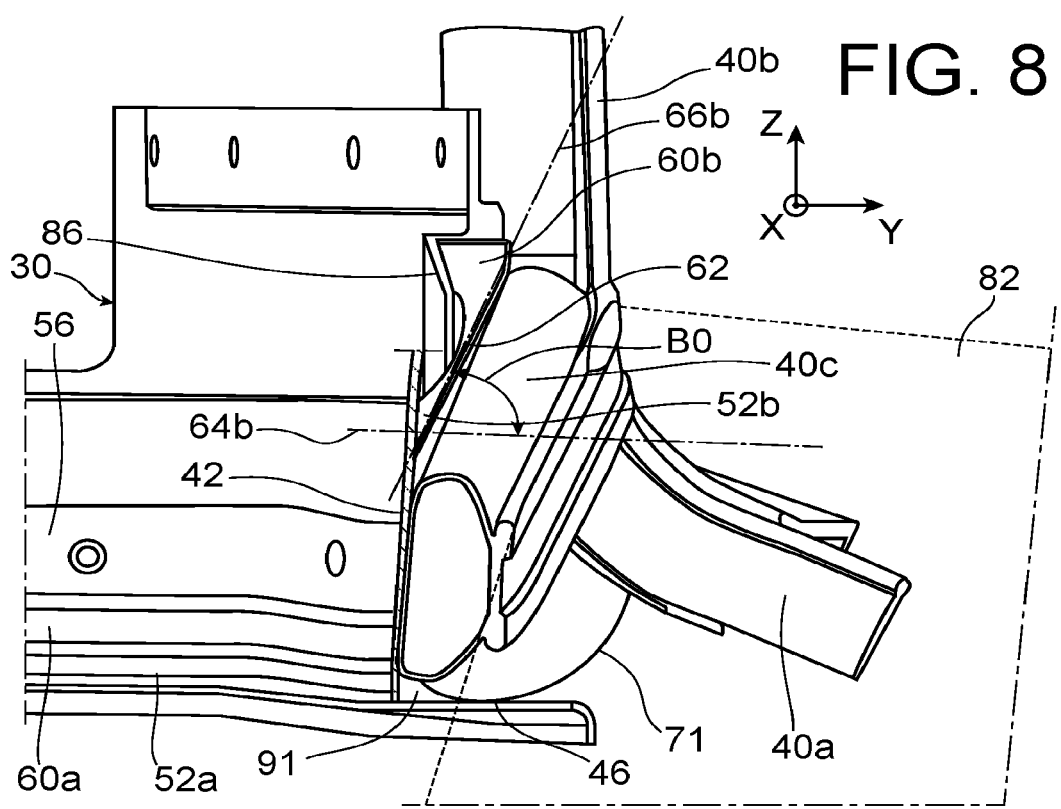
FIG. 8 represents a perspective view of the part shown on FIGS. 2 to 4, showing in particular the second contact lip of the fire resistance device, in the stressed state.
Figure 11:
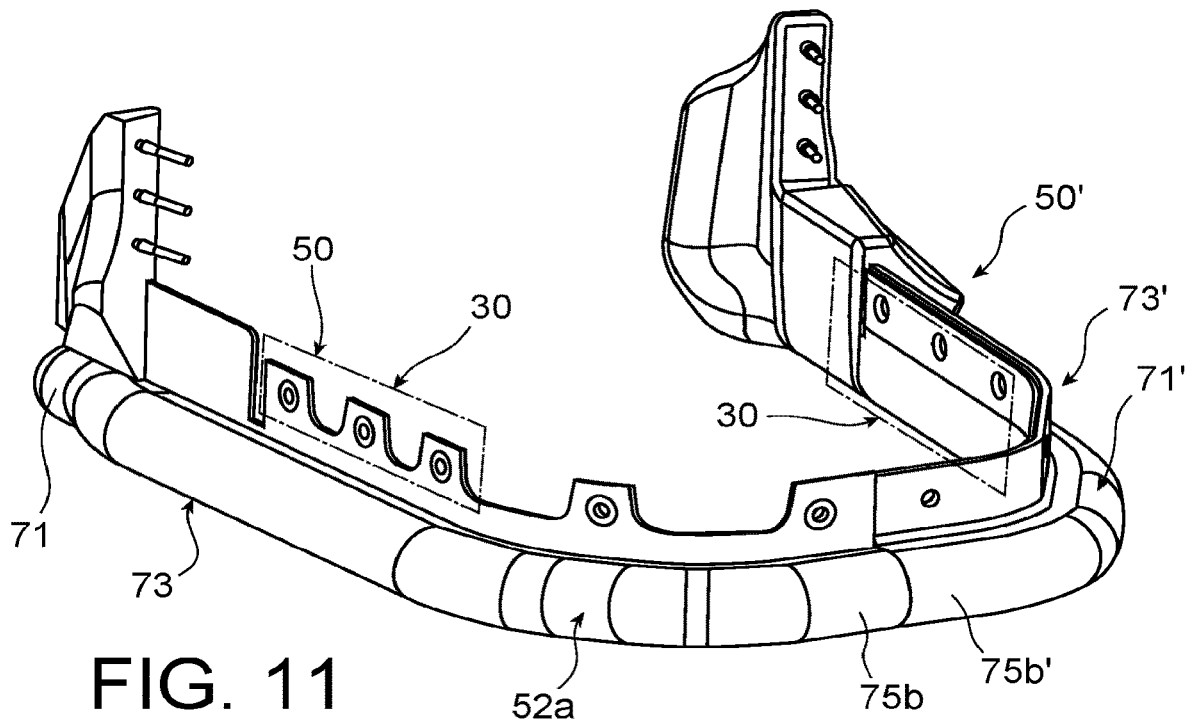
FIG. 11 represents the association between a fire resistance device according to the previous figures, and a conventional complementary device.
Figure 12:
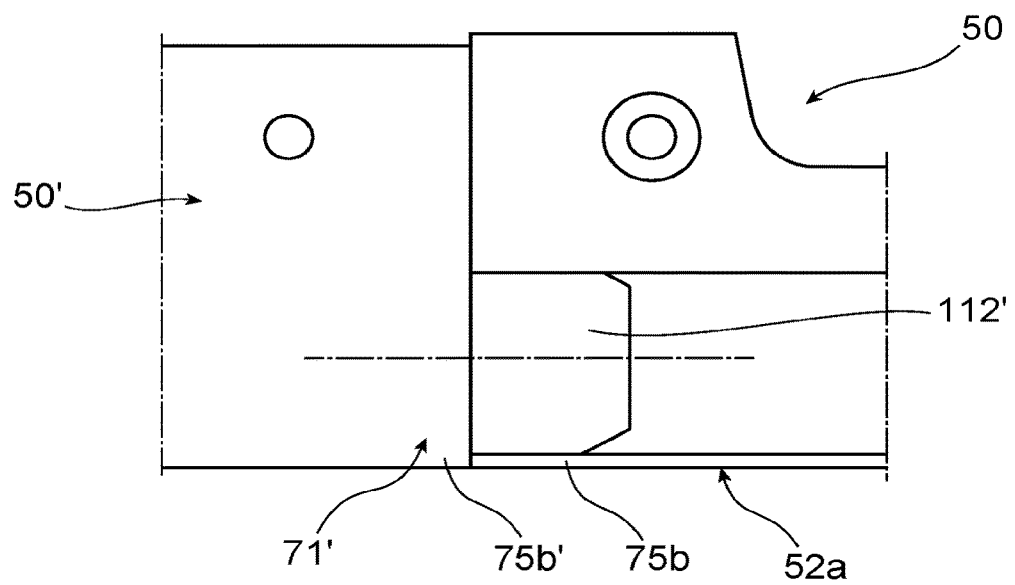
FIG. 12 is a rear view of part of the association of devices shown on FIG. 11.
Figure 13:
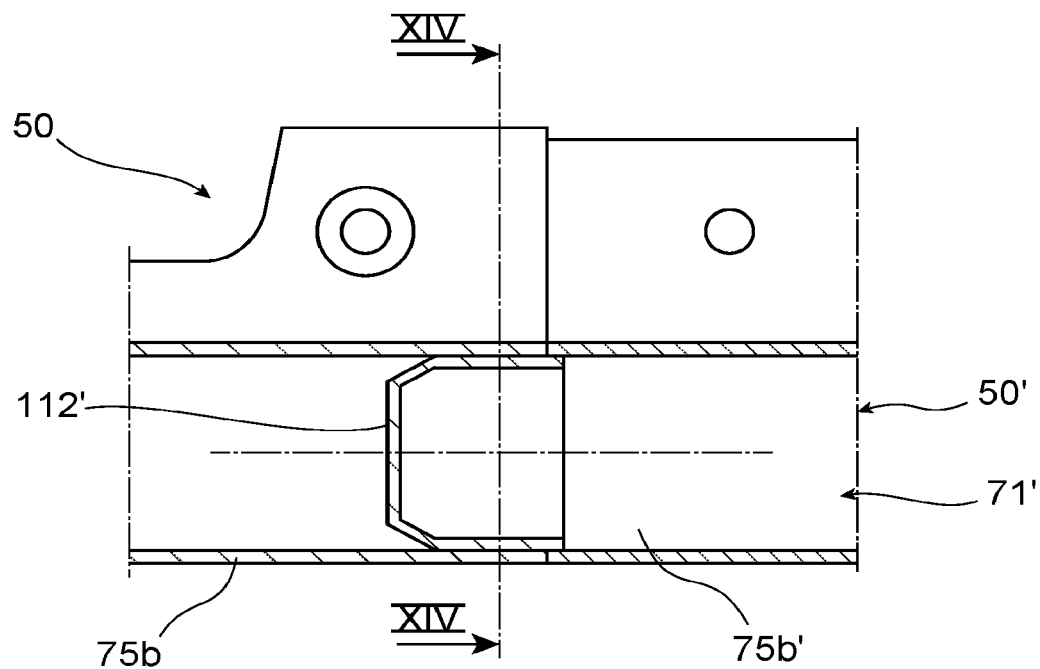
FIG. 13 is a sectional view, similar to the view in the preceding figure.
Figure 14:
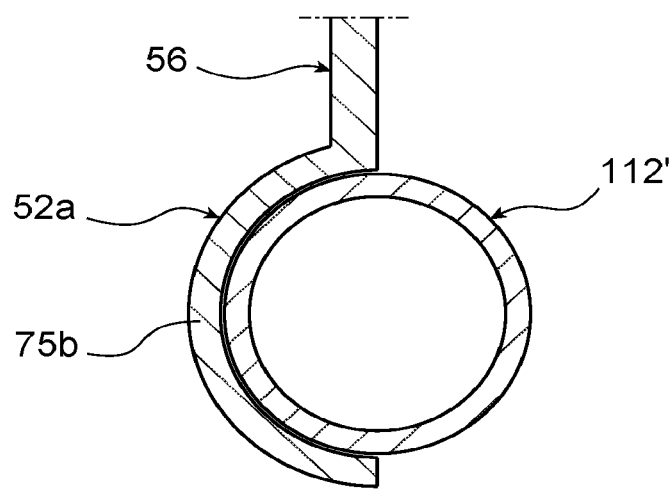
FIG. 14 is a sectional view along line XIV-XIV on FIG. 13.

In the assembled state of the device 50, its second contact lip 52b is stressed along the Y direction by the third portion 40c of the pod seal. With reference to FIG. 8, when the pod cover 82 (represented diagrammatically only) is closed, the third leg 40c of the seal 40 fixed to this cover bears on the second lip 52b. The latter is then constrained between the lateral face 42 of the mounting strut and the third portion 40c of the seal 40, implying pivoting of the lip 52b in its junction zone 62. Due to this pivoting, the angle B0 increases above the angle observed in the unstressed state in FIG. 6d. The value of this angle B0 depends on the degree of compression of the fire resistance device 50, that itself depends on the amplitude of relative movements between the turbojet and the mounting strut. FIG. 8 also show that the third portion 40c of the seal 40 is stressed along the Y direction, implying that its tubular sealing part is deformed between the pod cover 82 and the lip 52b. Thus, the tubular part that has a substantially circular section in the unstressed state, is flattened under the stress, for example to take on an elliptical, oval or similar shape.

This FIG. 8 also shows that the presence of the beaded segment 71 severely limits the leakage section 91 between the lateral face 42 of the mounting strut and this segment, even at large deformation levels leading to high values for the angle B0. The fact that such a bead-shaped downstream end is provided in the downstream direction and being open in the upstream direction helps to facilitate obtaining a satisfactory and controlled seal with the lateral face 42 of the mounting strut. The leakage section 91 thus remains reasonable, even in the case of large values of pivoting of the second lip 52b.

Figure 2:
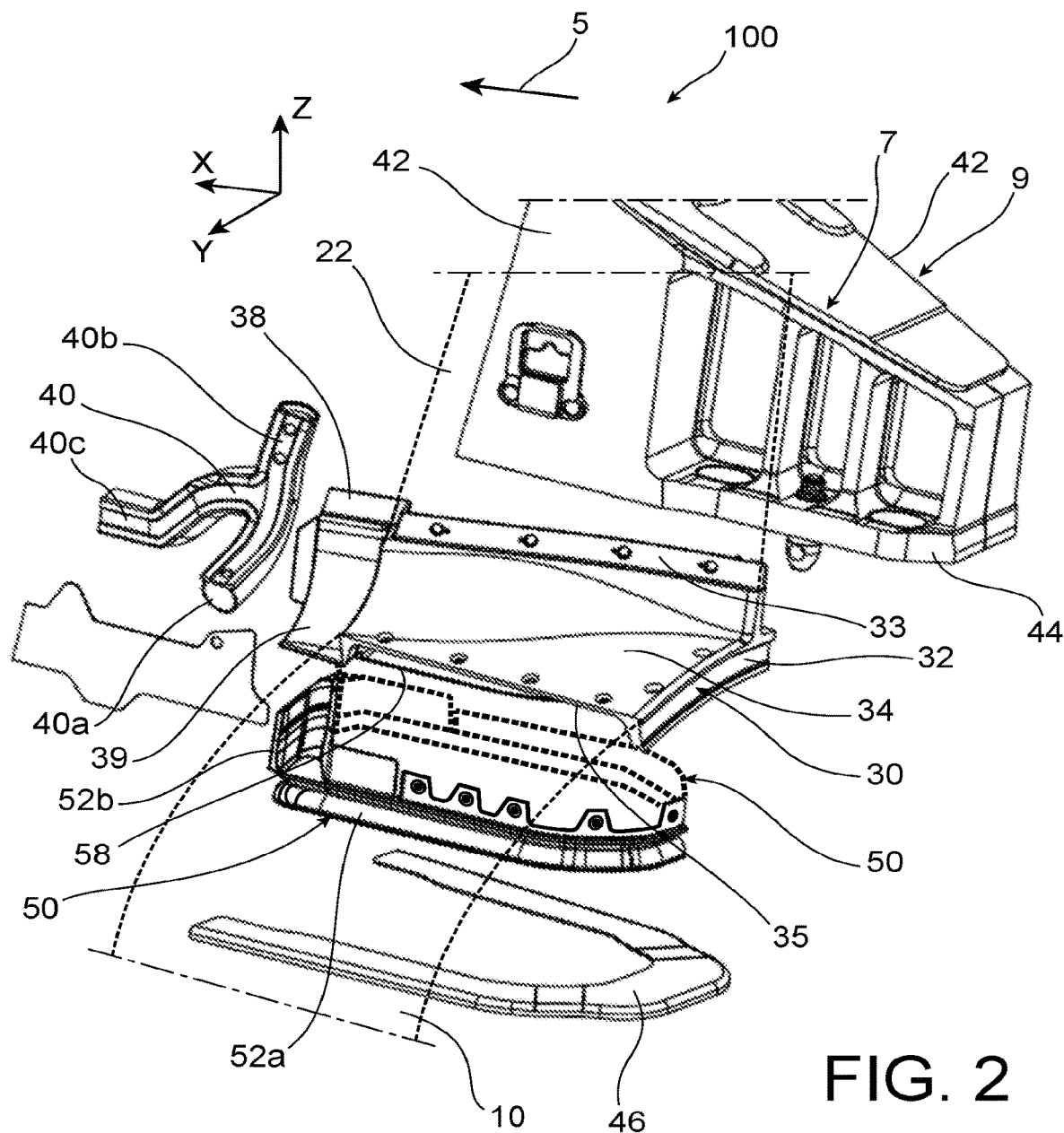
FIG. 2 represents an exploded perspective view of part of the propulsion assembly shown on FIG. 1.
Figure 7:
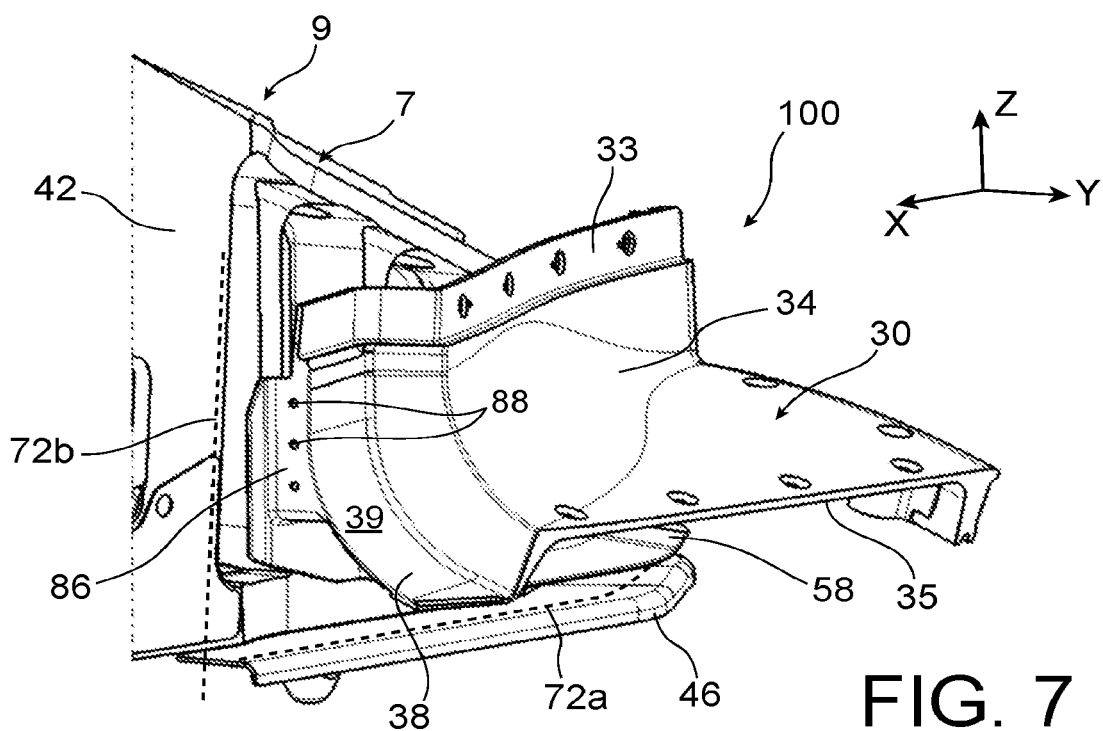
FIG. 7 is a perspective view of the part shown on FIGS. 2 to 4, diagrammatically showing the seal line obtained by means of the fire resistance device.

Again with reference to FIG. 8, it is shown that the support portion 60 of the device 50 fits into a second support 86, provided on the connection cowling 30, at its downstream end 38 forming the seal housing 39 that can be seen on FIG. 2. The second support 86, that is best seen on FIG. 7, is provided with holes 88 through which the elongated attachment elements 90 will pass, supported by the support portion 60, on the side opposite the side on which the lip 52b and its junction zone 62 are located. These elongated elements 90 are made in a single piece with the device 50, or are added onto this device 50. For example, they may be formed by rods, the end of which will be compressed on the surface opposite the second support 86 through which they pass.

Another specific feature of the invention lies in the single-piece manufacturing of the fire resistance device 50. In other words, all the above-mentioned elements of the device 50 are made in a single-piece, preferably by compression moulding. This single-piece manufacturing is not affected by the presence of the beaded segment, because the beaded segment remains open at one of its axial ends, and preferably only extends over a very short length.

This single-piece part may possibly include the elongated attachment elements 90, while the inserts 81 are considered to be add-on elements external to the device because they form part of its attachment means to the connection cowling 30.

For manufacturing of the device 50, the device may be a simple elastomer block, but this block will preferably be combined with one or several layers with different functions.

In the example represented on FIGS. 9 and 10, the device 50 is formed by the superposition of layers made of an elastomer material 99 and preferably a silicone elastomer material, and fibrous functional layers 110, along the direction of the thickness 92 of the device 50. These layers may include glass fabric layers that reinforce the stiffness of the device. Specific fire resistance layers can then be included, for example made of ceramic fibre. Preferably, they are arranged in the zones of the device most exposed to the flame. Since the silicone elastomer material of the layers 99 degrades into silica in the presence of severe heat, the mesh of the fabrics 110 used can retain these degraded particles.

The alternation of layers can be completed by fibrous meta-aramid layers 110, always to reinforce the stiffness of the assembly. One of the layers could even be coated on the external surface of the lips, to limit wear and damage due to parts in contact.

The layers 99 and 110 are preferably parallel to each other, along the profile of the device 50. At least one or several of these layers can extend over the entire height of the device 50, and from one end of the device to the other along the direction of the above-mentioned first curved line 72a.

The length of the device 50 along the X direction can be between 30 and 50 cm, whereas the width of this device along the Y direction is of the order of 10 to 20 cm. Finally, the maximum height of the device 50 along the Z direction can be of the order of 15 to 20 cm. Each lip 52a, 52b only extends over a few centimeters.

Concerning fire resistance conferred by the device 50, in addition to complying with the requirements of standards ISO 2685-1998 and AC 20-135, the most severe conditions are considered, namely resistance to fire in flight and resistance to fire on the ground. In particular, this implies the design of a solution to perform the fire resistance function under the following conditions:
- flame temperature: 1100±80° C.;
- vibration: ±0.4 mm at a frequency of 50 Hz;
- pressure: 0.4 bars during the first 5 minutes of the fire test;
- test duration: 15 min, broken down into 2 phases:
  - 5 min: Applied positive pressure; and
  - 10 min: Atmospheric pressure;
- self-extinguishing within a limited time.

In the embodiment described above, two devices 50 specific to the invention are associated with the circumferential bearing surface 46. It is particularly easy to make a junction between the two at the upstream longitudinal ends 75b of each of their first lips 52a. The two C-shaped ends 75b (one of which can be seen on FIG. 6b) can easily overlap, and thus assure continuity for the fire resistance barrier at the junction zone between the two devices 50.

But the invention is also suitable for installation on an existing propulsion assembly, to replace only one of the two conventional devices already in position on this assembly. This function is shown on FIGS. 11 to 14, showing the association between a device 50 according to the invention, and a complementary fire resistance device 50' with a conventional design. The two devices are designed to be fixed to the two connection cowlings 30 of the propulsion assembly.

The design of the complementary fire resistance device 50' is conventional, with several elements added one above the other. It globally comprises a beaded seal 71' extending substantially over the entire length of the device 50', this seal being intended to be forced into contact with the peripheral bearing surface of the mounting strut, like the contact structure 73 of the device 50. In the unstressed state as shown on FIGS. 11 to 14, the section of the beaded seal 71' is circular in shape.

This beaded seal 71' thus forms the contact structure 73' of the complementary device 50', and has its upstream longitudinal end 75b' fitted with a connection pin 112'. This pin 112' is hollow, it also has a circular section with a smaller diameter than the bead, possibly chamfered at its closed-off terminal part. Concerning the device 50, the upstream longitudinal end 75b of its first contact lip 52a, with a C-shaped section, is perfectly adapted to cooperate with this connection pin 112'. The inside diameter of the C can be substantially equal to the outside diameter of the connection pin 112', so that this connection pin can be housed inside the upstream C-shaped longitudinal end 75b. This overlap that can be seen on FIGS. 12 to 14 and that is effectively nested, assures continuity of the fire resistance barrier at the junction between the new device 50 and the complementary device 50' already installed on the propulsion assembly. The replacement of only one of the two existing devices is thus facilitated by the design of the disclosed invention.

Obviously, an expert in the subject can make various modifications to the invention as it has just been described solely through non-limitative examples, within the scope defined by the appended claims.

The invention claimed is:

1. A fire resistance device designed to be placed between an upstream end of a mounting strut of an aircraft twin-spool turbomachine, and a connection cowling installed on said turbomachine, said connection cowling being designed to connect an upstream ring delimiting part of an inter-flow compartment radially outwards, to an arm passing radially through a fan flow stream of the turbomachine, wherein the device comprises:
   a contact structure comprising a first contact lip with a C-shaped section, the contact structure also comprising a beaded segment at one on the longitudinal ends of the first contact lip, one of the axial ends of the beaded section is open and is continuous with the first lip and the other axial end is closed off, the first lip and the beaded segment together defining a first contact end extending along a first curved line;
   a support portion; and
   a second contact lip supported by the support portion through a junction zone that supports the beaded segment of the contact structure, the second contact lip having a second contact end extending along a second line distinct from the first line,
   and wherein the fire resistance device is a single-piece.

2. The device according to claim 1, wherein said second line is straight, and substantially orthogonal to a first substantially plane contact surface wherein the first curved line is inscribed.

3. The device according to claim 1, comprising an attachment portion supporting the first contact lip, said attachment portion containing through holes for the passage of attachment elements.

4. The device according to claim 1, wherein the support portion carries elongated attachment elements, opposite the second lip and its second junction zone.

5. The device according to claim 1, wherein said device incudes a superposition of at least one layer of a silicone elastomer material, and at least one fibrous layer made of ceramic, glass or meta-aramid.

6. A propulsion unit for an aircraft comprising a twin-spool turbomachine for an aircraft, and a turbomachine mounting strut for use in fastening the turbomachine to a wing element of the aircraft;
   the turbomachine comprising an inter-flow compartment formed between a core engine flow and a fan flow of the turbomachine, and an arm passing radially through the fan flow, and communicating with the inter-flow compartment that is partly delimited radially outwards by an upstream ring connected to the arm by with two connection cowlings arranged with one on each side of an upstream end of the mounting strut, along a transverse direction of the propulsion unit;

the upstream end of the mounting strut comprising two lateral faces, and a peripheral bearing surface along the contour of a base of this upstream end of the mounting strut;

wherein the propulsion unit also comprises a fire resistance device according to claim 1, associated with at least one of the two connection cowlings, placed between the upstream end of the mounting strut and the connection cowling to which the device is fixed.

7. The propulsion unit according to claim 6 wherein:

the first contact end bears on the peripheral bearing surface of the upstream end of the mounting strut; and wherein the second contact end of the second contact lip bears on the corresponding lateral face of the upstream end of the mounting strut.

8. The propulsion unit according to claim 6, wherein:

the first curved line is inscribed in a first substantially plane contact surface substantially parallel to the transverse direction, and to a longitudinal direction of the assembly; and wherein the second line defined by the second contact lip is a straight line extending substantially parallel to a vertical direction of the propulsion unit.

9. The propulsion unit according to claim 6, wherein;

the second contact lip is constrained between the lateral face of the upstream end of the mounting strut; and a seal of a pod mobile cover.

10. The propulsion unit according to claim 6, wherein;

the propulsion unit also comprises a complementary fire resistance device associated with the other of the two connection cowlings, placed between the upstream end of the mounting strut and the connection cowling to which the complementary device is fixed, the complementary device comprising:

a contact structure in the form of a beaded seal, one longitudinal end of which is fitted with a connection pin cooperating with the other longitudinal end of the first contact lip belonging to the fire resistance device.

* * * * *